United States Patent
Tsai

(10) Patent No.: US 8,425,107 B2
(45) Date of Patent: Apr. 23, 2013

(54) BLENDER WITH STIRRING DISK

(76) Inventor: Wen-Hung Tsai, Taipei (TW)

( * ) Notice: Subject to any disclaimer, the term of this patent is extended or adjusted under 35 U.S.C. 154(b) by 0 days.

(21) Appl. No.: 13/431,310

(22) Filed: Mar. 27, 2012

(65) Prior Publication Data

US 2012/0300575 A1    Nov. 29, 2012

(30) Foreign Application Priority Data

May 26, 2011  (TW) .............................. 100209468 U

(51) Int. Cl.
*A47J 43/046* (2006.01)
*A47J 43/07* (2006.01)

(52) U.S. Cl.
USPC ............ 366/205; 366/314; 366/316; 366/317

(58) Field of Classification Search .......... 366/197–206, 366/305, 314–317; 241/282.1, 282.2; 99/348, 99/453

See application file for complete search history.

(56) References Cited

U.S. PATENT DOCUMENTS

| 4,664,530 A | * | 5/1987 | Kurome et al. | 366/205 |
| 4,900,159 A | * | 2/1990 | Jamison | 366/343 |
| 6,568,844 B1 | * | 5/2003 | Årthun et al. | 366/274 |
| 2012/0300575 A1 | * | 11/2012 | Tsai | 366/205 |

FOREIGN PATENT DOCUMENTS

JP           1-136616     *  5/1989

* cited by examiner

*Primary Examiner* — Charles E Cooley
(74) *Attorney, Agent, or Firm* — Hershkovitz & Associates, LLC; Abraham Hershkovitz

(57) ABSTRACT

A blender has a base, an axle assembly mounted on the base, a container securely attached to an axle housing of the axle assembly, and a stirring disk securely mounted on an axle of the axle assembly. A user puts foodstuffs, such as powder material, syrup, liquid material, ice cubes and so on, or tea leaves and water, into the container, and then drives the axle assembly and the stirring disk to rotate. Thus, stirring ribs of the stirring disk stir and mix the foodstuffs without crushing the foodstuffs, or the tealeaves and the water are brewed into tea. The blender is simple, easy and safe, especially for a person or a household to use.

19 Claims, 12 Drawing Sheets

BLENDER WITH STIRRING DISK

BACKGROUND OF THE INVENTION

1. Field of the Invention

The present invention relates to a blender, especially to a blender that mixes and stirs foodstuffs without crushing solids in the foodstuffs.

2. Description of the Prior Art(s)

A blender is a common household or beverage shop appliance used to mix, puree or emulsify fruits or foodstuffs. With improvements of the blenders, conventional blenders are capable of grinding soybeans with water to produce soymilk, crushing ice to make smoothies or milling grains with other foodstuffs to make sauces by using suitable blade assemblies. Moreover, the conventional blender is also capable of turning liquid milk into milk froth by using a milk-frothing disk in substitution for the blade assembly.

However, whenever the conventional blender operates, the blade assembly of the conventional blender crushes solid foodstuffs, such as ice, fruits, grains and so on. The conventional blender is neither able to merely mix and stir the liquid and the solid foodstuffs to result in a "shaking" effect, nor able to brew tea by pouring water and putting tealeaves into the conventional blender.

To overcome the shortcomings, the present invention provides a blender to mitigate or obviate the aforementioned problems.

SUMMARY OF THE INVENTION

The main objective of the present invention is to provide a blender. The blender has a base, an axle assembly mounted on the base, a container securely attached to an axle housing of the axle assembly and a stirring disk securely mounted on an axle of the axle assembly.

A user puts foodstuffs such as powder material, syrup, liquid material, ice cubes and so on, into the container, and then drives the axle assembly and the stirring disk to rotate. Thus, stirring ribs of the stirring disk stir and mix the foodstuffs without crushing the foodstuffs. Moreover, when the user puts tealeaves and pours water into the container, the stirring ribs stir the tealeaves and the water to brew tea and to extract nutrition from the tealeaves. The blender is simple, easy and safe, especially for a person or a household to use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
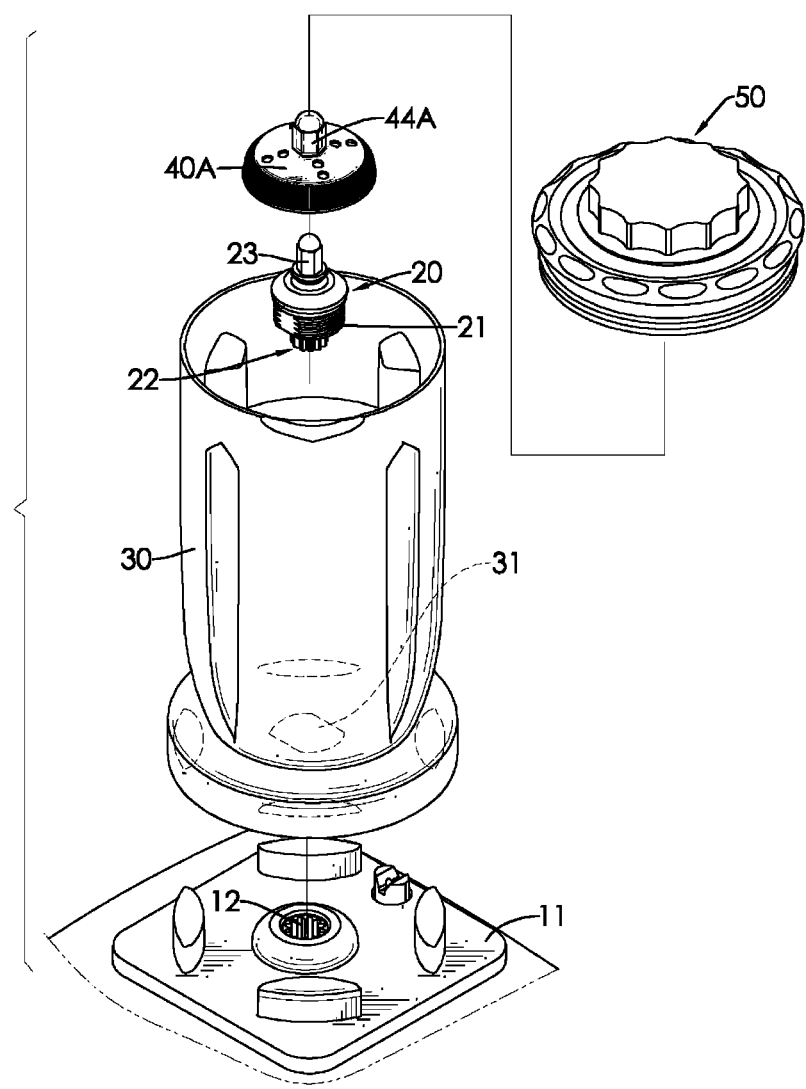
FIG. 1 is an enlarged exploded perspective view of a blender in accordance with the present invention, showing a first embodiment of a stirring disk mounted in the blender.
Figure 2:
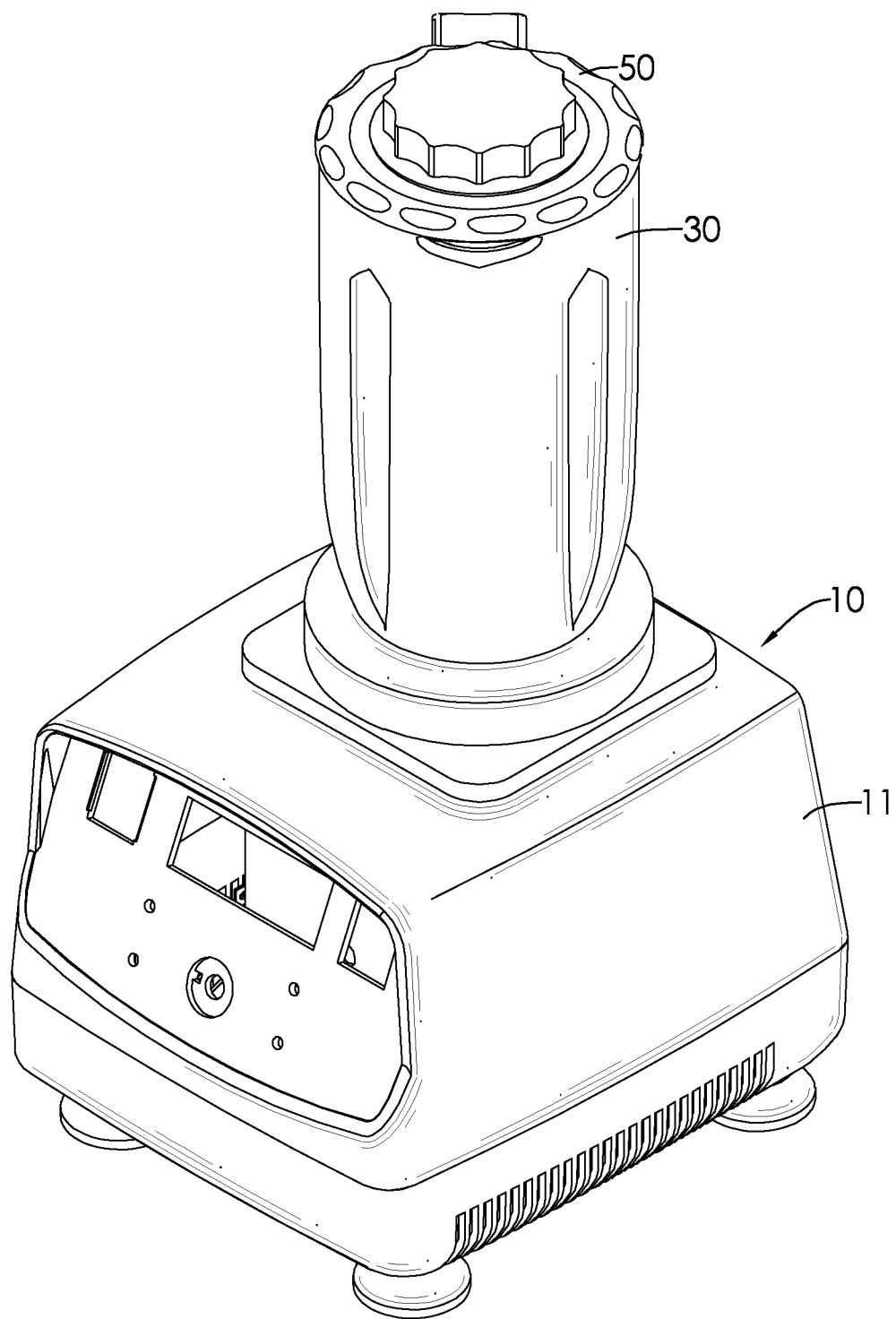
FIG. 2 is a perspective view of the blender in FIG. 1.

With reference to FIGS. 1, 2, 5, 8, 9 and 12, a blender in accordance with the present invention comprises a base 10, an axle assembly 20, a container 30, a stirring disk 40A, 40B, 40C, 40D, 40E and a lid 50.

The base 10 has a base housing 11 and a driving device. The driving device may be a motor, is mounted in the base housing 11 and has a driving member 12 protruding through a top of the base housing 11.

Figure 3:
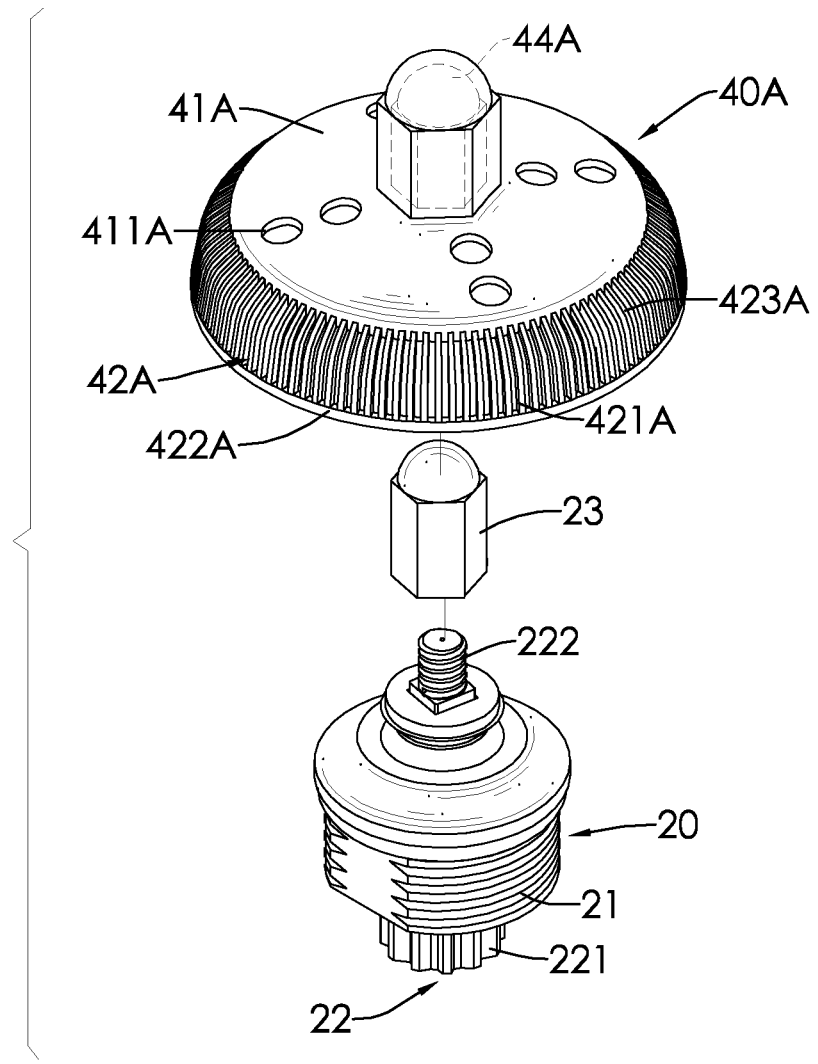
FIG. 3 is an enlarged exploded perspective view of the blender in FIG. 1, showing the first embodiment of the stirring disk and an axle assembly.

With further reference to FIG. 3, the axle assembly 20 is detachably mounted on the top of the base housing 11 and has an axle housing 21, an axle 22 and a nut 23. The axle 22 is axially mounted through the axle housing 21 and has an upper end 222, a lower end 221 and an outer thread. The lower end 221 of the axle 22 is connected to the driving member 12 of the driving device of the base 10 to allow the driving device to rotate the axle 22. The outer thread is formed on the upper end 222 of the axle 22. The nut 23 may be a hexagon nut, is mounted on the upper end 222 of the axle 22 and engages the outer thread of the axle 22.

The container 30 is mounted on the top of the base housing 11, is securely attached to the axle housing 21 and has an upper opening and a pivot hole 31. The upper opening of the container 30 allows a user to put foodstuffs into the container 30. The pivot hole 31 is formed through a bottom of the container 30 for the axle housing 21 to be mounted through the pivot hole 31.

Figure 4:
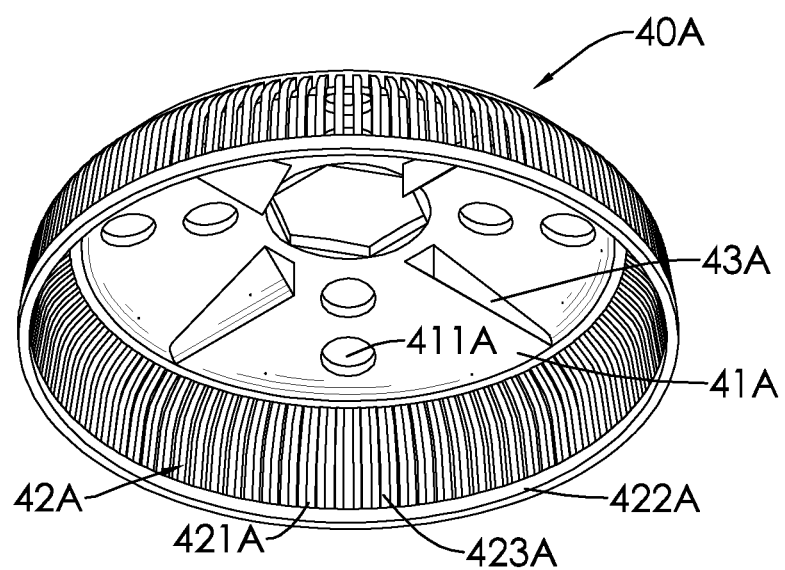
FIG. 4 is a perspective view of the first embodiment of the stirring disk in FIG. 1.
Figure 10:
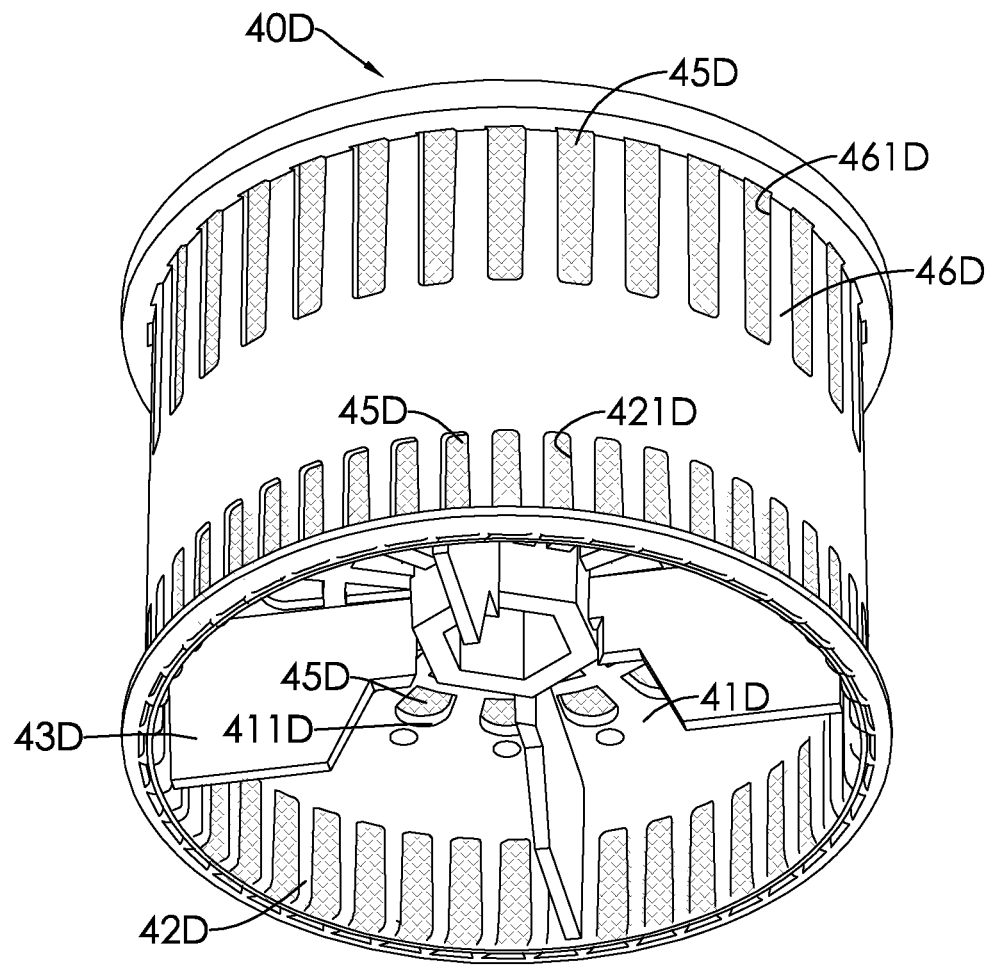
FIG. 10 is a perspective view of the fourth embodiment of the stirring disk in FIG. 9.

With further reference to FIGS. 4 and 10, the stirring disk 40A, 40B, 40C, 40D, 40E is securely mounted on the upper end 222 of the axle 22 and has a panel 41A, 41B, 41C, 41D, 41E, a lower sidewall 42A, 42B, 42C, 42D, 42E and multiple stirring ribs 43A, 43B, 43D, 43E.

The panel 41A, 41B, 41C, 41D, 41E is securely mounted on the upper end 222 of the axle 22, is securely mounted on the nut 23 of the axle 22 and has multiple through holes 411A, 411B, 411C, 411D, 411E and a mounting portion 44A, 44E. The through holes 411A, 411B, 411C, 411D, 411E are formed through the panel 41A, 41B, 41C, 41D, 41E. The mounting portion 44A, 44E is formed on a center of the panel 41A, 41E, is hollow, is securely mounted on the nut 23 of the axle 22 and has a lower opening for the mounting portion 44A to be mounted around the nut 23 of the axle 22.

The lower sidewall 42A, 42B, 42C, 42D, 42E is formed around an outer peripheral edge of the panel 41A, 41B, 41C, 41D, 41E, protrudes toward a lower surface of the panel 41A, 41B, 41C, 41D, 41E, is disposed around the axle housing 21 and has multiple lower through holes 421A, 421B, 421C, 421D, 421E. The lower through holes 421A, 421B, 421C, 421D, 421E are separately formed through and are arranged around the lower sidewall 42A, 42B, 42C, 42D, 42E. Each lower through hole 421A, 421B, 421C, 421D, 421E extends longitudinally.

The stirring ribs 43A, 43B, 43D, 43E are separately formed on the panel 41A, 41B, 41D, 41E. Each stirring rib 43A, 43B, 43D, 43E extends radially on the panel 41A, 41B, 41D, 41E.

With reference to FIGS. 3 and 4, in a first embodiment of the stirring disk 40A, the through holes 411A of the panel 41A are radially arranged on the panel 41A. The lower sidewall 42A has an annular frame 422A and multiple connecting frames 423A. The annular frame 422A is disposed below and around the panel 41A. The connecting frames 423A are separately arranged around and are disposed between the annular frame 422A and the panel 41A. Each connecting frame 423A is arc-shaped and has two ends respectively connecting to the annular frame 422A and the panel 41A. Each lower through hole 421A is defined between two adjacent connecting frames 423A. The stirring ribs 43A are formed on the lower surface of the panel 41A.

Figure 5:
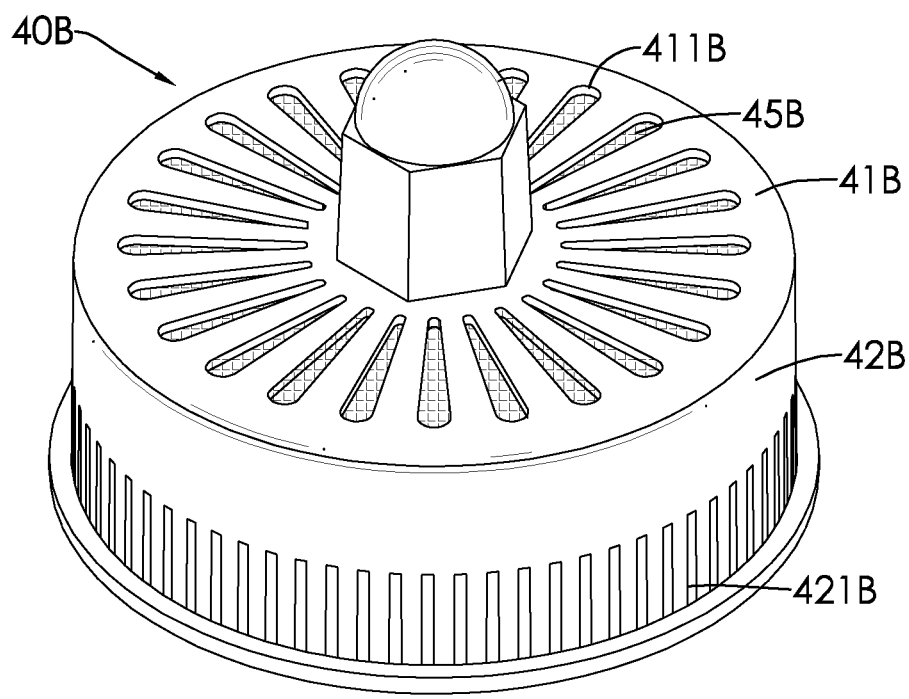
FIG. 5 is a perspective view of a second embodiment of a stirring disk.
Figure 6:
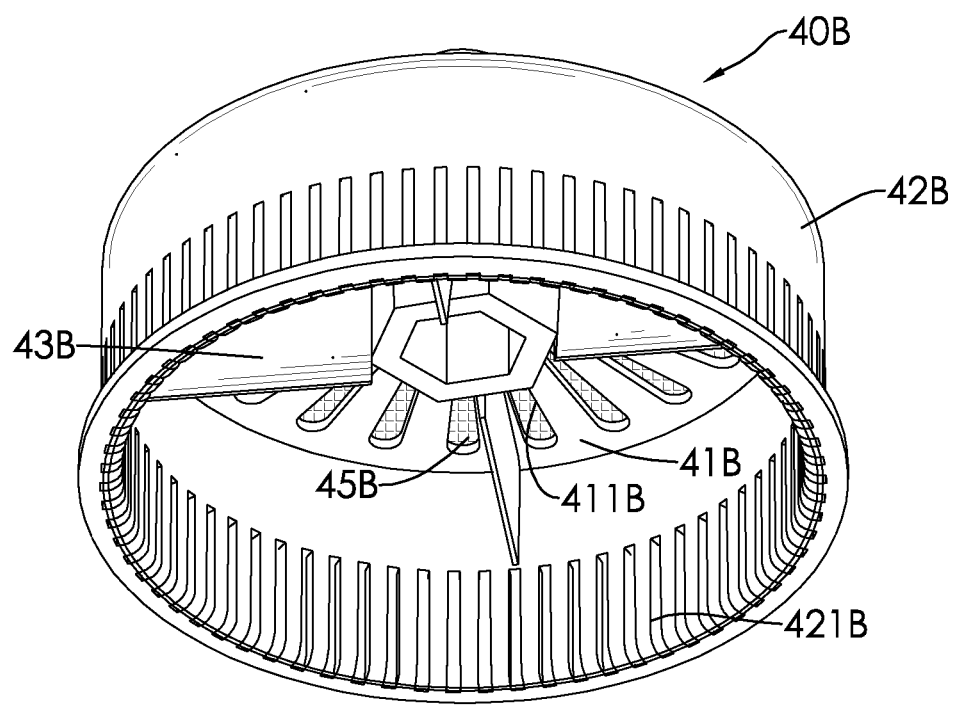
FIG. 6 is another perspective view of the second embodiment of the stirring disk in FIG. 5.
Figure 7:
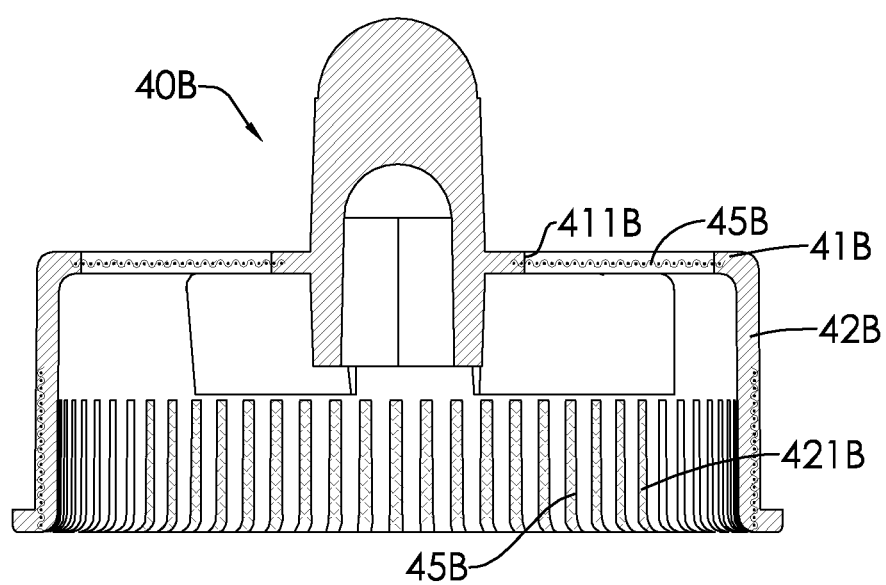
FIG. 7 is a cross-sectional side view of the second embodiment of the stirring disk in FIG. 5.

With reference to FIGS. 5 to 7, in a second embodiment of the stirring disk 40B, each through hole 411B of the panel 41B is elongated and extends radially on the panel 41B. The lower sidewall 42B is perpendicular to the panel 41B. The lower through holes 421B of the lower sidewall 42B are formed through the lower sidewall 42B. The stirring ribs 43B are formed on the lower surface of the panel 41B. Each stirring rib 43B is a sheet. The stirring disk 40B further has multiple nets 45B respectively mounted in the through holes 411B of the panel 41B and the lower through holes 421B of the lower sidewall 42B.

Figure 8:
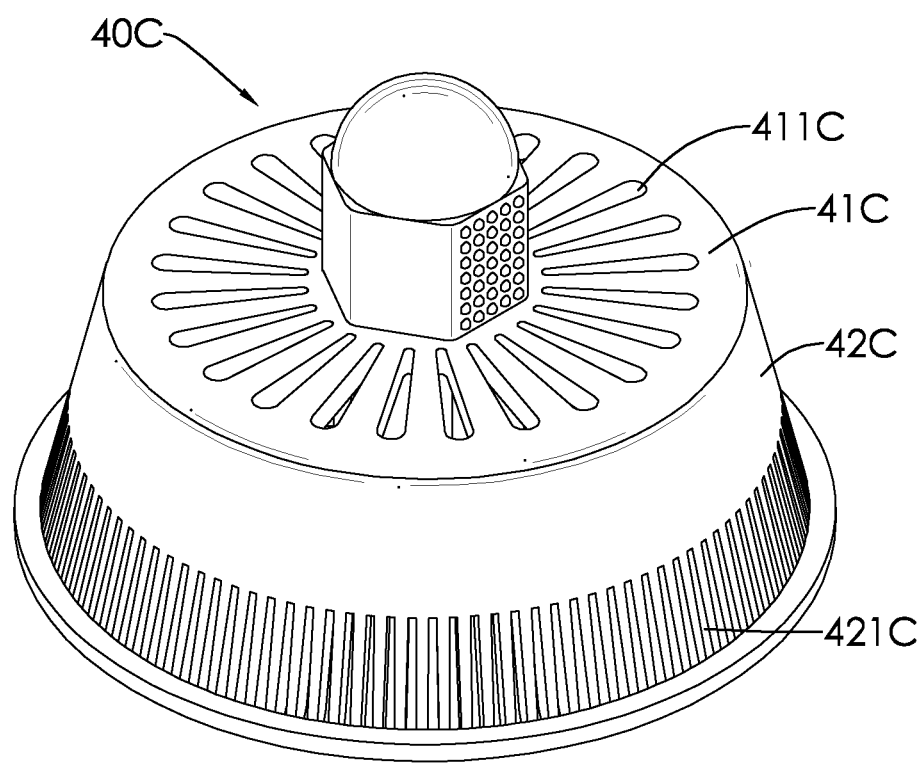
FIG. 8 is a perspective view of a third embodiment of a stirring disk.

With further reference to FIG. 8, in a third embodiment of the stirring disk 40C, the lower sidewall 42C obliquely protrudes outwardly toward the lower surface of the panel 41C. Each through hole 411C of the panel 41C is elongated and extends radially on the panel 41C. The lower through holes 421C of the lower sidewall 42C are formed through the lower sidewall 42C.

Figure 9:
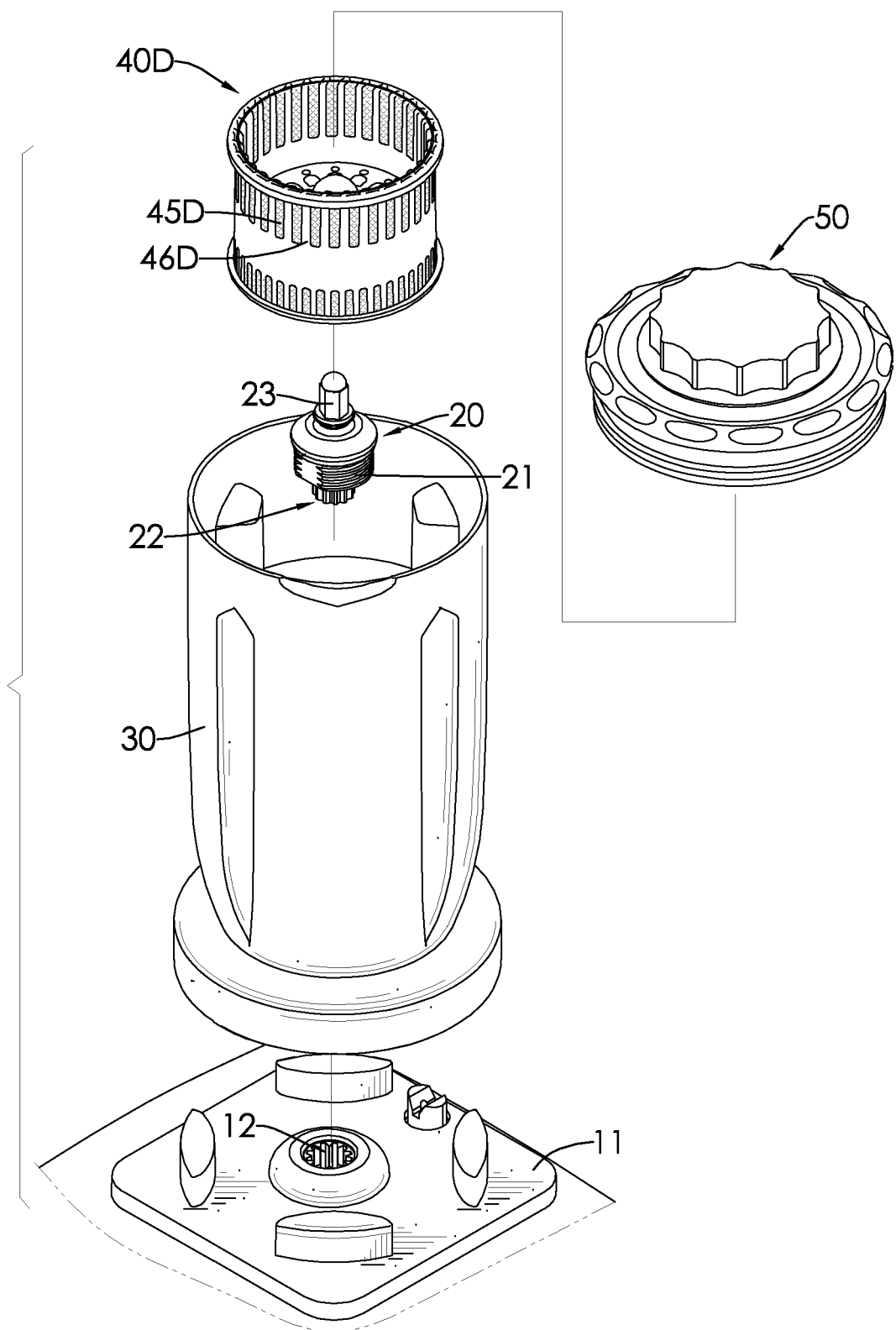
FIG. 9 is an enlarged exploded perspective view of a blender in accordance with the present invention, showing a fourth embodiment of a stirring disk mounted in the blender.
Figure 11:
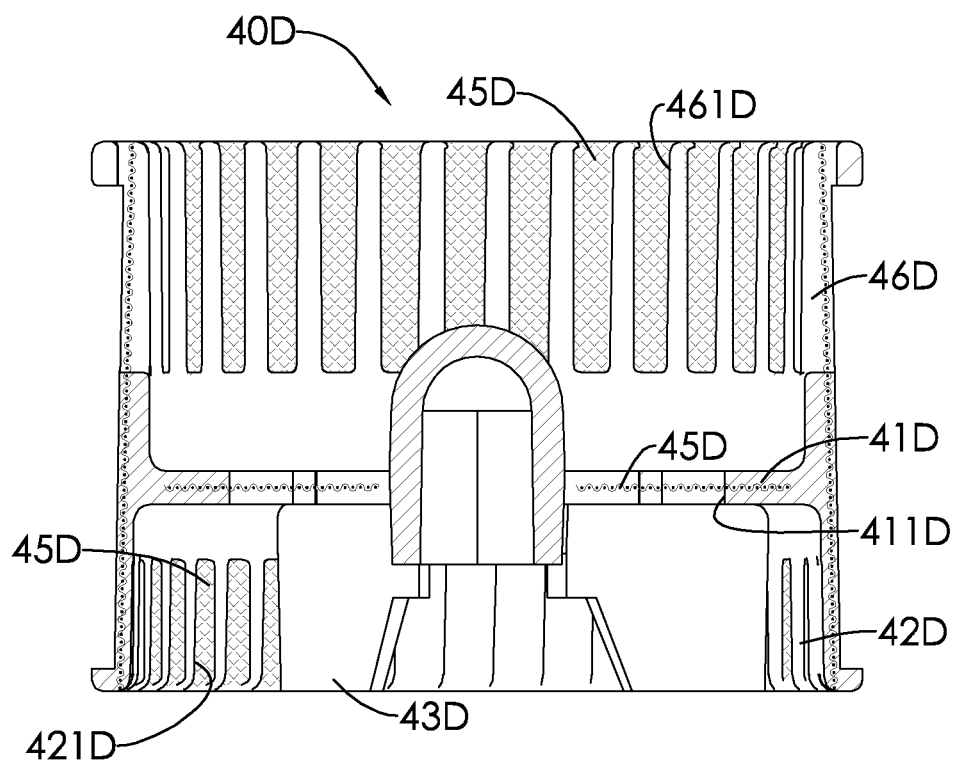
FIG. 11 is a cross-sectional side view of the fourth embodiment of the stirring disk in FIG. 9.

With reference to FIGS. 9 to 11, in a fourth embodiment of the stirring disk 40D, the stirring disk 40D further has an upper sidewall 46D formed around the outer peripheral edge of the panel 41D, protruding toward an upper surface of the panel 41D and having multiple upper through holes 461D. The upper through hoes 461D are separately formed through and are arranged around the upper sidewall 46D. The nets 45D are respectively mounted in the through holes 411D of the panel 41D, the lower through holes 421D of the lower sidewall 42D and the upper through holes 461D of the upper sidewall 46D.

Figure 12:
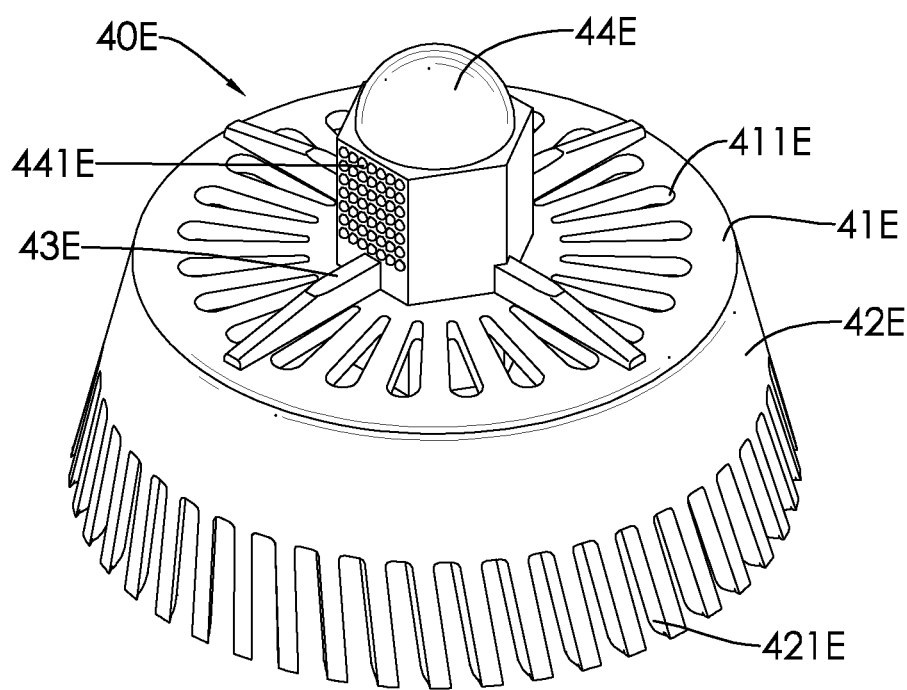
FIG. 12 is a perspective view of a fifth embodiment of the stirring disk.

With further reference to FIG. 12, in a fifth embodiment of the stirring disk 40E, each through hole 411E of the panel 41E is elongated and extends radially on the panel 41E. The lower through holes 421E of the lower sidewall 42E are formed through a distal peripheral edge of the lower sidewall 42E. The stirring ribs 43E are formed on the upper surface of the panel 41E. The mounting portion 44E further has a holding portion 441E. The holding portion 441E is formed on an outer surface of the mounting portion 44E and may have multiple protrusions or may be a rough surface so allows the user to stably hold the stirring disk 40E by the mounting portion 44E.

The lid 50 is mounted on and covers the upper opening of the container 30.

The blender as described has the following advantages. The user puts the foodstuffs such as powder material, syrup, liquid material, ice cubes and so on, into the container 30, and then switches on the driving device of the base 10 to drive the driving member 12, the axle 22 of the axle assembly 20 and the stirring disk 40A, 40B, 40C, 40D, 40E to rotate. Thus, the stirring ribs 43A, 43B, 43D, 43E are capable of stirring and mixing the foodstuffs in the container 30 without crushing the foodstuffs. Moreover, when the user puts tealeaves and pours water into the container 30, the stirring ribs 43A, 43B, 43D, 43E stir the tealeaves and the water to brew tea and to extract nutrition from the tealeaves. The through holes 411A, 411B, 411C, 411D, 411E, the lower through holes 421A, 421B, 421C, 421D, 421E, the upper through holes 461D and the nets 45B, 45D of the stirring disk 40A, 40B, 40C, 40D, 40E allow passage of the liquid foodstuffs and split bubbles in the liquid foodstuffs into foams to improve taste of the mixed foodstuffs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blender comprising:
    a base having a base housing and a driving device mounted in the base housing and having a driving member protruding through a top of the base housing;
    an axle assembly detachably mounted on the top of the base housing and having an axle housing and an axle axially mounted through the axle housing and having an upper end and a lower end connected to the driving member of the driving device of the base;
    a container mounted on the top of the base housing and securely attached to the axle housing; and
    a stirring disk securely mounted on the upper end of the axle and having:
        a panel securely mounted on the upper end of the axle and having multiple through holes formed through the panel;
        a lower sidewall formed around an outer peripheral edge of the panel, protruding toward a lower surface of the panel and having multiple lower through holes separately formed through the lower sidewall; and
        multiple stirring ribs separately formed on the panel.

2. The blender as claimed in claim 1, wherein the stirring disk further has an upper sidewall formed around the outer peripheral edge of the panel, protruding toward an upper surface of the panel and having multiple upper through holes separately formed through the upper sidewall.

3. The blender as claimed in claim 2, wherein the stirring disk further has multiple nets respectively mounted in the through holes of the panel, the lower through holes of the lower sidewall, and the upper through holes of the upper sidewall.

4. The blender as claimed in claim 3, wherein
    the axle further has an outer thread formed on the upper end of the axle;
    the axle assembly further has a nut mounted on the upper end of the axle and engaging the outer thread of the axle; and
    the panel of the stirring disk is securely mounted on the nut of the axle and further has a mounting portion formed on a center of the panel, being hollow, securely mounted on the nut of the axle and having a lower opening for the mounting portion to be mounted around the nut of the axle.

5. The blender as claimed in claim 4, wherein the stirring ribs are formed on the lower surface of the panel of the stirring disk.

6. The blender as claimed in claim 4, wherein the stirring ribs are formed on the upper surface of the panel of the stirring disk.

7. The blender as claimed in claim 2, wherein
the axle further has an outer thread formed on the upper end of the axle;
the axle assembly further has a nut mounted on the upper end of the axle and engaging the outer thread of the axle; and
the panel of the stirring disk is securely mounted on the nut of the axle and further has a mounting portion formed on a center of the panel, being hollow, securely mounted on the nut of the axle and having a lower opening for the mounting portion to be mounted around the nut of the axle.

8. The blender as claimed in claim 7, wherein the stirring ribs are formed on the lower surface of the panel of the stirring disk.

9. The blender as claimed in claim 7, wherein the stirring ribs are formed on the upper surface of the panel of the stirring disk.

10. The blender as claimed in claim 1, wherein the stirring disk further has multiple nets respectively mounted in the through holes of the panel and the lower through holes of the lower sidewall.

11. The blender as claimed in claim 10, wherein
the axle further has an outer thread formed on the upper end of the axle;
the axle assembly further has a nut mounted on the upper end of the axle and engaging the outer thread of the axle; and
the panel of the stirring disk is securely mounted on the nut of the axle and further has a mounting portion formed on a center of the panel, being hollow, securely mounted on the nut of the axle and having a lower opening for the mounting portion to be mounted around the nut of the axle.

12. The blender as claimed in claim 11, wherein the stirring ribs are formed on the lower surface of the panel of the stirring disk.

13. The blender as claimed in claim 11, wherein the stirring ribs are formed on an upper surface of the panel of the stirring disk.

14. The blender as claimed in claim 1, wherein
the axle further has an outer thread formed on the upper end of the axle;
the axle assembly further has a nut mounted on the upper end of the axle and engaging the outer thread of the axle; and
the panel of the stirring disk is securely mounted on the nut of the axle and further has a mounting portion formed on a center of the panel, being hollow, securely mounted on the nut of the axle and having a lower opening for the mounting portion to be mounted around the nut of the axle.

15. The blender as claimed in claim 14, wherein the stirring ribs are formed on the lower surface of the panel of the stirring disk.

16. The blender as claimed in claim 14, wherein the stirring ribs are formed on an upper surface of the panel of the stirring disk.

17. The blender as claimed in claim 14, wherein
the through holes of the panel of the stirring disk are radially arranged on the panel;
the lower sidewall of the stirring disk has
an annular frame disposed below and around the panel; and
multiple connecting frames separately arranged around and disposed between the annular frame and the panel, and each connecting frame being arc-shaped and having two ends respectively connecting to the annular frame and the panel; and
each lower through hole of the lower sidewall is defined between two adjacent connecting frames.

18. The blender as claimed in claim 14, wherein the mounting portion of the panel of the stirring disk further has a holding portion formed on an outer surface of the mounting portion.

19. The blender as claimed in claim 1, wherein the lower through holes of the lower sidewall of the stirring disk are formed through a distal peripheral edge of the lower sidewall.

* * * * *